(12) United States Patent
Joerg et al.

(10) Patent No.: US 11,541,804 B2
(45) Date of Patent: Jan. 3, 2023

(54) LIGHTING DEVICE FOR A MOTOR VEHICLE

(71) Applicant: Valeo Vision, Bobigny (FR)

(72) Inventors: Alexandre Joerg, Bobigny (FR); Orane Marchal, Bobigny (FR)

(73) Assignee: Valeo Vision, Bobigny (FR)

(*) Notice: Subject to any disclaimer, the term of this patent is extended or adjusted under 35 U.S.C. 154(b) by 23 days.

(21) Appl. No.: 17/414,261

(22) PCT Filed: Dec. 9, 2019

(86) PCT No.: PCT/EP2019/084213
§ 371 (c)(1),
(2) Date: Jun. 15, 2021

(87) PCT Pub. No.: WO2020/126611
PCT Pub. Date: Jun. 25, 2020

(65) Prior Publication Data
US 2022/0032838 A1 Feb. 3, 2022

(30) Foreign Application Priority Data
Dec. 19, 2018 (FR) ...................................... 1873431

(51) Int. Cl.
*B60Q 1/12* (2006.01)
*F21S 41/663* (2018.01)
(Continued)

(52) U.S. Cl.
CPC ............ *B60Q 1/122* (2013.01); *F21S 41/663* (2018.01); *F21W 2102/155* (2018.01); *F21W 2102/19* (2018.01)

(58) Field of Classification Search
CPC .......... F21W 2102/135–155; F21W 2102/165; F21W 2102/19; F21W 2102/20;
(Continued)

(56) References Cited

U.S. PATENT DOCUMENTS

2012/0150338 A1  10/2012  Fujiyoshi et al.
2016/0069527 A1   3/2016  Komatsu
(Continued)

FOREIGN PATENT DOCUMENTS

FR    2934669 A1    2/2010
JP  2009220649 A   10/2009
(Continued)

OTHER PUBLICATIONS

Machine translation of JP 2016081874A, retrieved from worldwide. espacenet.com on Sep. 1, 2022 (Year: 2022).*
(Continued)

*Primary Examiner* — Rajarshi Chakraborty
*Assistant Examiner* — Steven Y Horikoshi
(74) *Attorney, Agent, or Firm* — Valeo Vision

(57) ABSTRACT

A motor vehicle lighting device that includes a means for emitting a first cut-off light beam along an optical axis where the cut-off is a substantially horizontal line that includes a cut where the cut extends in a coordinate system formed by a horizontal reference axis (HR) that is parallel to a first horizontal axis (HI) passing through the substantially horizontal line; and a vertical reference axis (VR) that is perpendicular to the horizontal reference axis (HR) and to an optical axis; where the optical axis passes through the coordinate system's center; Also is included a means for emitting a second light beam that is horizontally divided into a multitude of selectively activated light segments where the light segments illuminate a zone located astride of the first horizontal axis (HI) that is characterized by the cut, which includes a proximal longitudinal end along the horizontal reference axis (HR) between 1.25° and 1.5° or between −1.25° and −1.5° and which includes a lower vertical end along the vertical reference axis (VR) at a height of −0.75° or below.

15 Claims, 4 Drawing Sheets

(51) Int. Cl.
*F21W 102/155* (2018.01)
*F21W 102/19* (2018.01)

(58) Field of Classification Search
CPC ........ F21S 41/151; F21S 41/153; F21S 41/18;
F21S 41/43; F21S 41/663; B60Q 1/12;
B60Q 1/122
See application file for complete search history.

(56) References Cited

U.S. PATENT DOCUMENTS

2018/0356064 A1* 12/2018 Yamamoto .............. F21S 41/43
2019/0031086 A1*  1/2019 Gutjahr ................ F21S 41/663

FOREIGN PATENT DOCUMENTS

| JP | 2016081874 A | * | 5/2016 |
| JP | 2018083533 A | | 5/2018 |
| WO | 2017121560 A1 | | 7/2017 |

OTHER PUBLICATIONS

European Patent Office, International Search Report and Written Opinion of International Application No. PCT/EP2019/084213, dated Jan. 20, 2020.

* cited by examiner

[Figure 1]
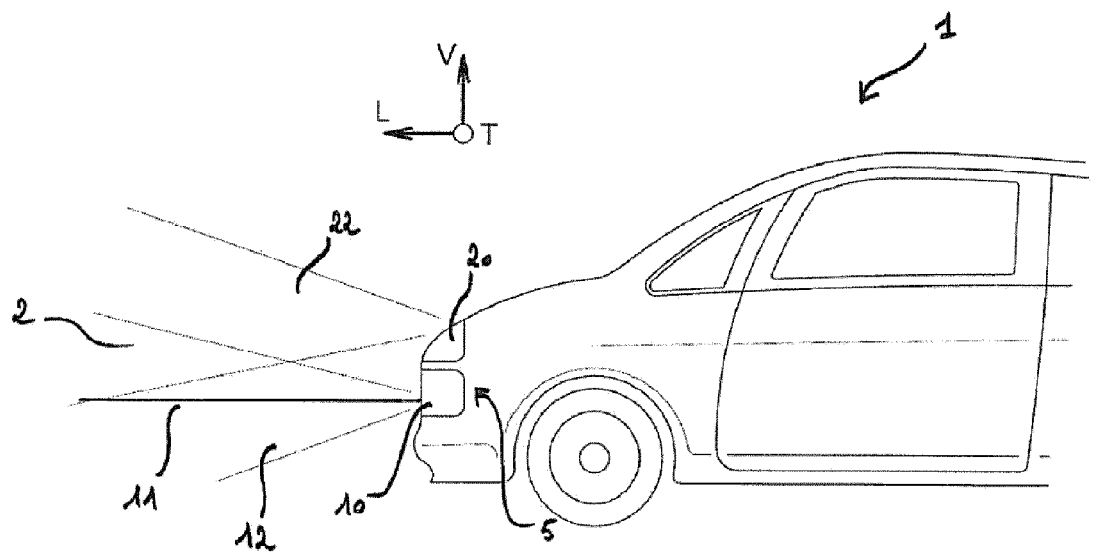
[Figure 2]
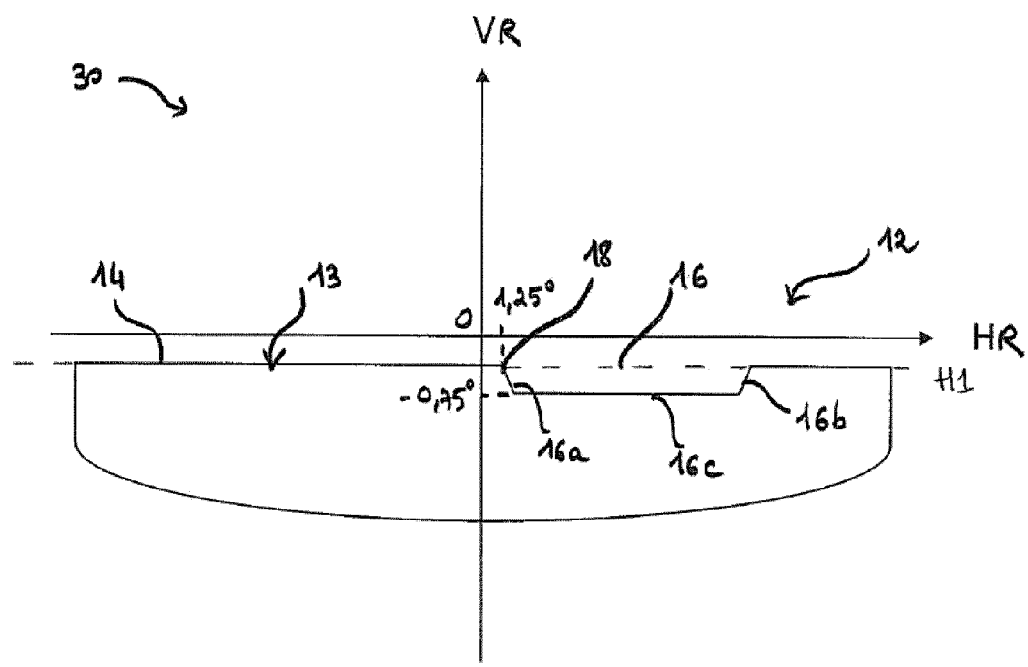

[Figure 3]
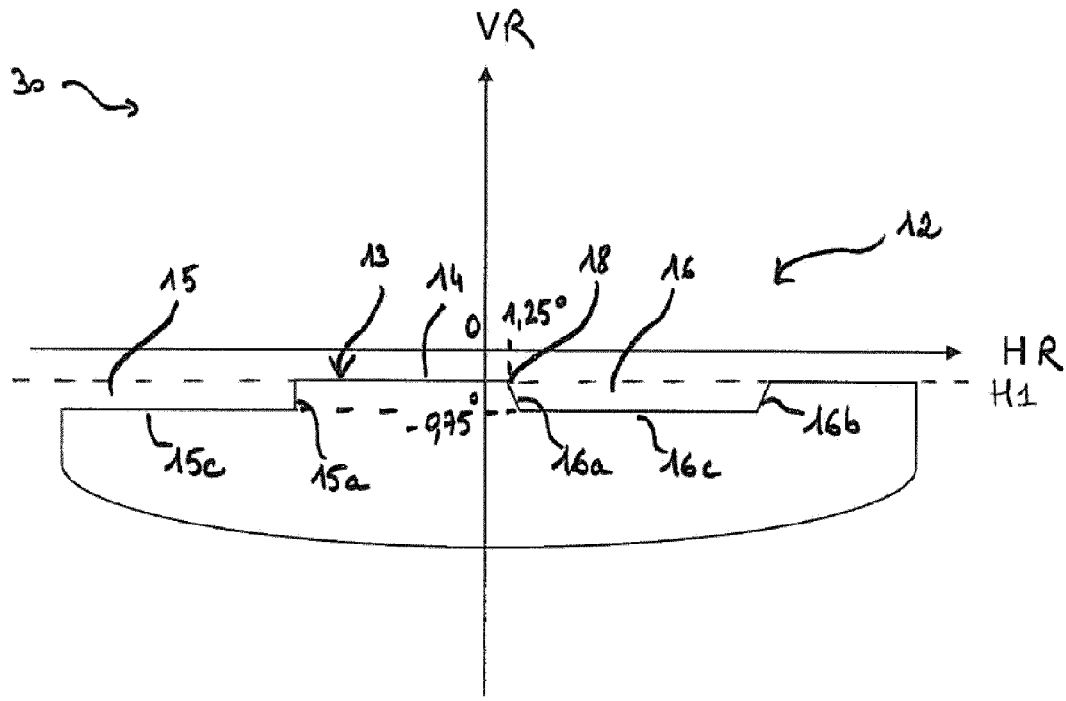
[Figure 4]
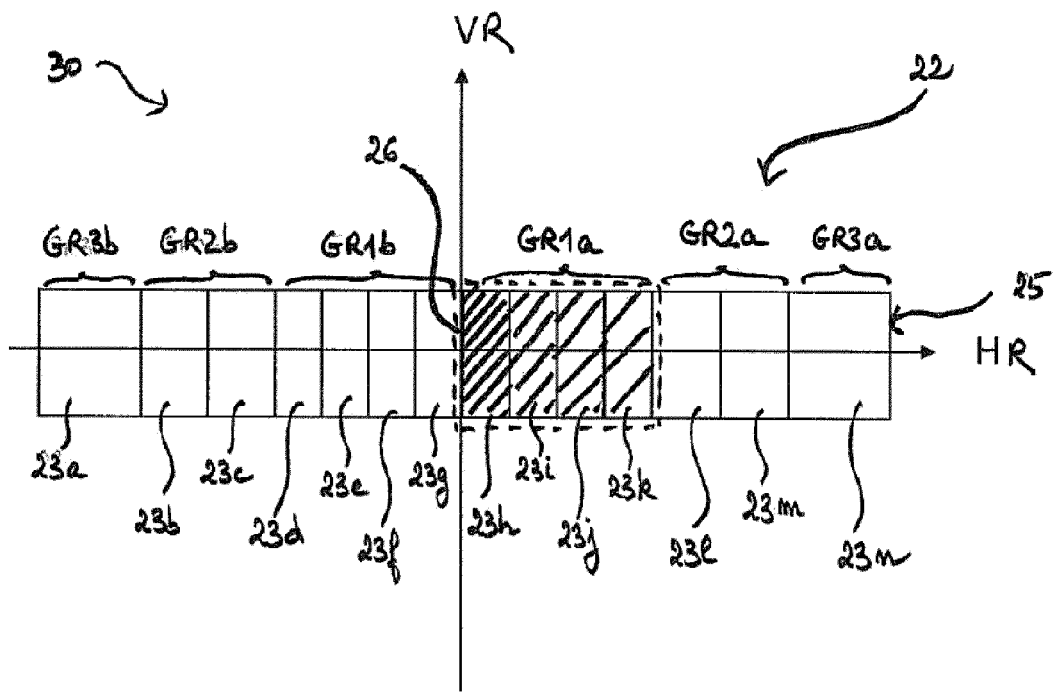

[Figure 5]
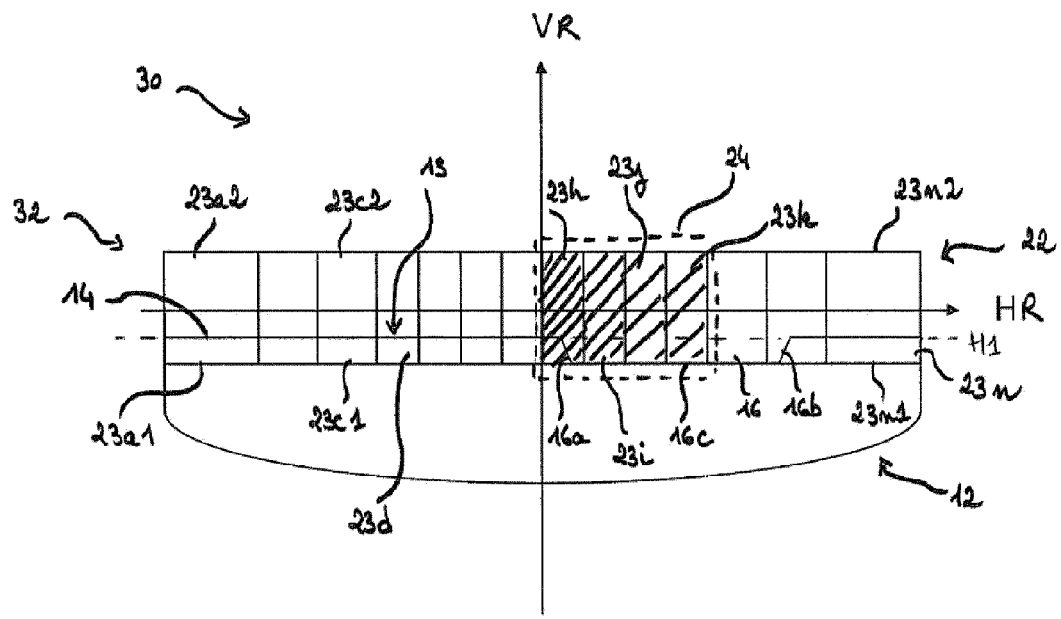
[Figure 6]
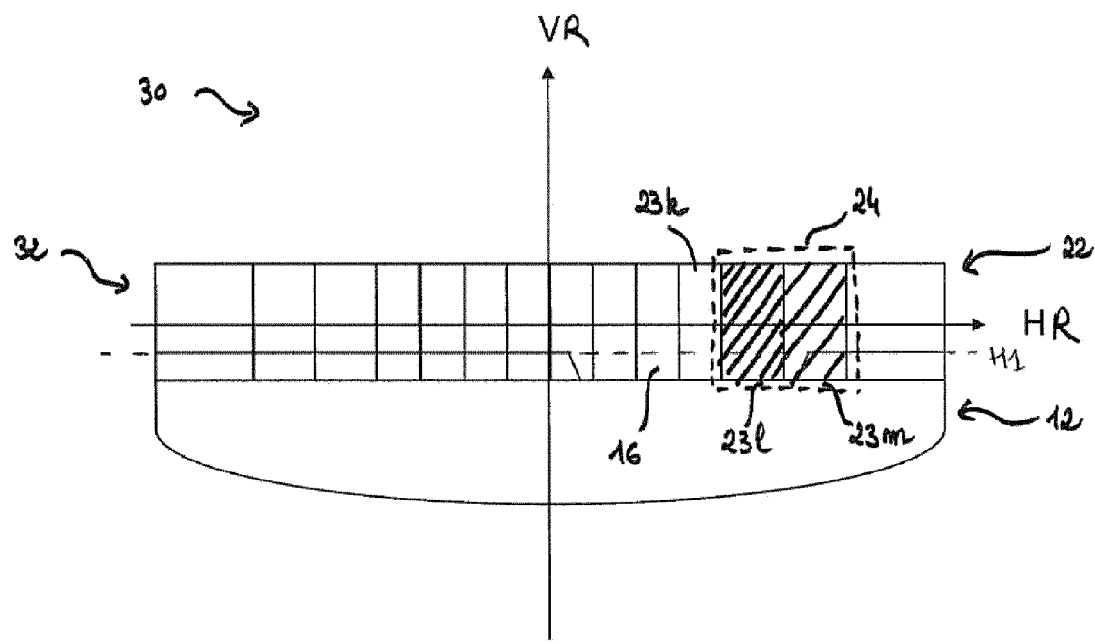

[Figure 7]
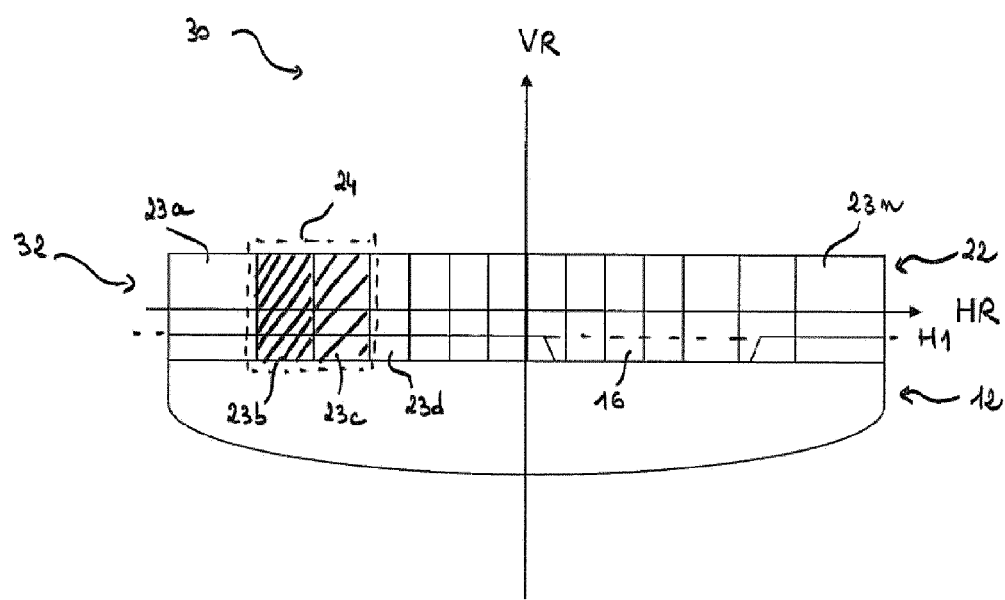

LIGHTING DEVICE FOR A MOTOR VEHICLE

CROSS-REFERENCE TO RELATED APPLICATIONS

This is a 371 application (submitted under 35 U.S.C. § 371) of International Application No. PCT/EP2019/084213 (WO2020/126611) filed on Dec. 9, 2019, which claims the priority date benefit of French Application No. FR1873431 filed on Dec. 19, 2018, the disclosures of which are hereby incorporated by reference in their entirety.

TECHNICAL FIELD

The invention relates to the field of lighting and/or signaling, in particular for motor vehicles. More particularly, the invention relates to a lighting device for a motor vehicle and to a method for controlling the lighting device.

BACKGROUND

Vehicles are increasingly equipped with driver assistance systems in order to improve passenger safety. In particular, vehicles may be equipped with lighting devices allowing adaptive lighting functions, also called an "adaptive driving beam" or ADB, to be performed.

In a first example, the vehicle may be equipped with a lighting device that is able to limit the risk of dazzling the driver of a vehicle that is being passed or that is ahead while maintaining good illumination of the road.

In another example, the vehicle may be equipped with a lighting device that is able to project a light beam that can track the trajectory of the car when turning in order to best illuminate the road for the driver. The light beam thus performs a dynamic bending lighting function, also called a "dynamic bending light" or DBL.

A first known way of producing such a light beam is to integrate, into the lighting device, a lighting module that produces a low beam which has a cutoff and which is movable within the lighting device. The lighting module can then pivot according to the angle of the turn followed by the vehicle.

This solution provides the driver with great driving comfort, since it allows the entire light beam to be pivoted. Thus, the cutoff of the low beam pivots at the same time as the vehicle and follows the turn. The driver therefore clearly sees the cutoff moving, regardless of the direction of the turn. However, it has the drawback of using moving parts, which leads to higher cost and greater bulk.

A solution without moving parts has been found and consists in producing such a light beam using the superposition of a low beam that has a cutoff, the cutoff having a first lower horizontal line and an upward bend for illuminating an upper region above a horizontal axis passing through said first line, and of a second light beam comprising a plurality of selectively activated light segments which are astride the horizontal axis of the cutoff of the low beam. The light intensity of each of the light segments can be modulated such that the position of a region of maximum intensity of the light beam is able to change according to the turns followed by the vehicle. The turn is then followed by electronically moving the region of maximum intensity of the light beam.

However, due to the high intensity of the low beam at the bend, the light segments of the second light beam cannot have a light intensity that is too high for the beam formed by the lighting device to remain regulatory. Consequently, the driver does not clearly perceive the light segments of the second light beam. The driver therefore does not benefit fully from the function provided by the second light beam.

In addition, when the vehicle is following a turn on the side of the bend of the cutoff of the low beam, the bend cannot be moved. It remains fixed with respect to the optical axis of the means for emitting the low beam. The light distribution is modified only by modifying the intensity of the light segments of the second light beam. The driver therefore does not perceive any movement of the cutoff of the low beam, the bend always remaining visible to the driver. Only the region of maximum intensity is moved.

SUMMARY

One known solution for overcoming the problem of perceiving the function and movement of the cutoff of the first beam consists in producing the light beam using the superposition of a first light beam that has a horizontal cutoff and of a second light beam that comprises a plurality of selectively activatable light segments which are astride the horizontal cutoff of the first light beam. The light intensity of each of the light segments can be modulated such that the position of a region of maximum intensity of the light beam is able to change according to the turns followed by the vehicle. The turn is then followed by electronically moving the region of maximum intensity of the light beam. In addition, since the first light beam does not have a bend, the light intensity of the light segments of the second light beam may have a higher intensity than in the previous solution. Furthermore, regardless of the direction of the turn, the driver clearly perceives a movement of a cutoff in the overall light beam formed by the superposition of the first light beam and of the second light beam since this is formed by the junction between a light segment that is on and a light segment that is off and the first light beam does not have a bend superposed over the segments. It can therefore be moved.

However, the first light beam does not necessarily form a regulatory low beam, in particular with regard to the UNECE R123 regulation in force as of the filing date of the application, which applies in European countries. Thus, the first light beam cannot be approved alone in these countries. Only an overall light beam resulting from the superposition of the first light beam and of the second light beam may be approved if it reconciles the regulatory requirements which dictate that the light intensity of the overall light beam must be higher than a predetermined value at certain points in the overall light beam and must be lower than another predetermined value at other points. This is difficult to achieve.

An aim of the invention is therefore to provide a lighting device that produces a regulatory overall light beam which is simple and which makes it possible to perform a dynamic bending lighting function without moving parts, which can be clearly perceived by the driver and which provides a level of driving comfort similar to that of a movable module.

To that end, what is provided, according to the invention, is a lighting device for a motor vehicle comprising:

a means for emitting, along an optical axis, a first light beam with cutoff, the cutoff having a substantially horizontal line comprising a cutout; the cutout extending in a coordinate system formed by a horizontal reference axis parallel to a first horizontal axis passing through said substantially horizontal line and a vertical reference axis perpendicular to the horizontal reference axis and to said optical axis, said optical axis passing through the center of the coordinate system;

a means for emitting a second light beam horizontally divided into a plurality of selectively activatable light segments, the light segments being able to illuminate a region located astride the first horizontal axis, characterized in that the cutout comprises:

a proximal longitudinal end located in the coordinate system along the horizontal reference axis between 1.25° and 1.5° or between −1.25° and −1.5°; and a lower vertical end located in the coordinate system along the vertical reference axis at a height of −0.75° or below.

What is meant by "proximal longitudinal end" is the longitudinal end of the cutout that is located closest to the vertical reference axis.

Thus, by virtue of the present invention, the overall light beam formed by the superposition of the first light beam with cutoff and of the second light beam makes it possible to form a regulatory low beam, in particular in accordance with the UNECE R123 regulation in force as of the filing date of the present application. Such an overall light beam may also comply with other regulations. When the vehicle is designed for right-hand driving, the cutout should be formed on the right-hand portion of the first light beam. The proximal longitudinal end of the cutout is located in the coordinate system along the horizontal reference axis between 1.25° and 1.5°. When the vehicle is designed for left-hand driving, the cutout should be formed on the left-hand portion of the first light beam. The proximal longitudinal end of the cutout is located in the coordinate system along the horizontal reference axis between −1.25° and −1.5°.

Specifically, by virtue of the shape of the cutout, certain points that require a high intensity remain illuminated both by the first light beam with cutoff and by the second light beam, which makes it possible to reach an intensity value predetermined by the regulations, and other points which were illuminated in the prior art both by the first light beam with cutoff and by the second light beam are now only illuminated by the second light beam. The intensity of these points thus does not exceed a value predetermined by the regulations.

In particular, in the case of R123 UNECE, when the vehicle is driving on the right-hand side, the point 75R located in the coordinate system along the horizontal reference axis at 1.25° and along the vertical reference axis at a height of −0.57° is illuminated by the first light beam with cutoff and by the second light beam. A sufficiently high intensity value may therefore be achieved. Additionally, the point Emax located in the coordinate system along the horizontal reference axis between 1.5° and 2° and along the vertical reference axis at a height of −0.57° is illuminated only by the second light beam. Thus, the intensity of the point Emax does not exceed a predetermined value.

Thus, for the points illuminated only by the second light beam, the intensity of the light segment of the second light beam illuminating this point may be higher, while keeping an intensity value below the predetermined value. Thus, this provides a greater amplitude of possible light intensities for the light segments superposed with the cutout. The movement of a region of maximum light intensity in the second light beam is then all the more perceptible because the difference in light intensity between the various light segments can be accentuated.

In addition, the movement of the region of maximum light intensity of the second light beam also makes it possible to move the region of maximum light intensity of the overall light beam. Thus, since the movement of the region of maximum light intensity in the second light beam is more perceptible, it is also more perceptible in the overall light beam. The driver then better perceives the movement of the region of maximum light intensity in the overall light beam, that is to say they better perceive the dynamic lighting function.

In addition, when the region of maximum light intensity is moved, the junction between an on light segment and an off light segment forming a cutoff can also be moved and this movement can be perceived by the driver regardless of the direction of movement. Specifically, the first light beam does not exhibit any upward bend hindering the perception of this junction. A level of driving comfort similar to that of a movable lighting module is then obtained.

The means for emitting the first light beam and the means for emitting the second light beam may be located in the same lighting module. Alternatively, they may each be in a distinct lighting module. Where applicable, the lighting modules may be integrated into the same headlamp of the vehicle or into separate headlamps.

The proximal longitudinal end of the cutout is formed by a segment that can be parallel to the vertical reference axis or by an oblique segment, that is to say a segment that has an inclination with respect to the vertical reference axis.

Its position in the coordinate system along the horizontal reference axis is taken at the level of the substantially horizontal line corresponding to the upper end of the segment forming the proximal longitudinal end of the cutout.

In a first example, the cutout may be delimited only by the proximal longitudinal end and the lower vertical end. The first light beam then has a recess over its entire width from the proximal longitudinal end.

In a second example, the cutout may be delimited by the proximal longitudinal end, the lower vertical end and a distal longitudinal end which is the end located furthest from the vertical reference axis. The cutout then forms a notch in the first light beam.

Advantageously, the lighting device has two neighboring light segments having a junction superposed over the vertical reference axis. Thus, the junction between these two neighboring segments makes it possible to produce a cutoff in the overall light beam at the level of the vertical reference axis.

Preferably, the light segments of the second light beam comprise a lower vertical end and the height of the lower vertical end of each of the light segments which are superposed with the cutout is located in the coordinate system along the vertical reference axis at −0.75° or below and the height of the lower vertical end of the cutout is substantially the same as the height of the lower vertical end of the light segment which has the highest lower vertical end from among all of the light segments which are superposed with the cutout. What is meant by substantially the same is that there may be a slight overlap between the light segments and the cutout so that the overall light beam is uniform. Thus, the light segments of the second light beam which completely cover part of the cutout are not superposed with the first light beam. Thus, the light intensity of the light segments which completely cover part of the cutout is not limited by the light intensity of the first light beam with cutoff. It is therefore easier to control the light intensity at the cutout, and the light segments may have a higher intensity which makes them more visible.

For example, the lower vertical ends of each light segment of the second light beam are all located at the same height along the vertical reference axis at −0.75° or below and the height of the lower vertical end of the cutout is substantially the same as the height of the lower vertical end of the light segments.

Advantageously, the cutoff of the first light beam has a second cutout having a proximal longitudinal end located in the coordinate system along the horizontal reference axis at −3° or less, when the proximal longitudinal end of the cutout is located between 1.25° and 1.5°, or at 3° or more, when the proximal longitudinal end of the cutout is located between −1.25° and 1.5°. Thus, it is possible to increase the light intensity of the light segments which are superposed with the second cutout and to have a greater amplitude of possible light intensities for these light segments.

Advantageously, the second cutout has a lower vertical end located in the coordinate system along the vertical reference axis (VR) at a height of −0.75° or below.

Advantageously, the height of the lower vertical end of the second cutout is the same as the height of the lower vertical end of the cutout.

Advantageously, the second light beam is able to illuminate above the first horizontal axis over the entire width of the first light beam with cutoff Thus, the entire width of the scene that can be illuminated by the first light beam can also be illuminated by the second light beam. The dynamic lighting function may then be achieved over the entire width of the first light beam with cutoff.

According to a first variant, all of the light segments of the second light beam have a width, taken along the horizontal reference axis, that is the same. This configuration makes it possible to have an identical resolution over the entire width of the second light beam.

According to a second variant, at least two light segments of the second light beam have a width, taken along the horizontal reference axis, that is different. This configuration makes it possible to decrease the number of light segments and therefore to decrease the cost of the lighting device.

In particular, the light segments of the second light beam have a width that gets wider with increasing distance from the vertical reference axis. The number of light segments is thus significantly decreased while retaining better resolution close to the optical axis of the means for emitting the first light beam.

In a first example, the increase in the width of the light segments with increasing distance from the vertical reference axis may be continuous. In this case, the width of each light segment following a light segment that is located closer to the vertical reference axis is greater than the width of this light segment located closer to the vertical reference axis.

In a second example, the increase in the width of the light segments with increasing distance from the vertical reference axis may be stepped. In this case, the light segments are distributed into groups of light segments of the same width; and the width of the light segments of each group of light segments following a group of light segments that is located closer to the vertical reference axis is greater than the width of the light segments of this group of light segments that is closer to the vertical reference axis.

Advantageously, the light intensity of each light segment is capable of being individually modulated between an off state and a state of maximum light intensity. Thus, it is possible to move the region of maximum light intensity of the second light beam, and therefore the region of maximum light intensity of the overall light beam.

In particular, the light segments of the second light beam may be activated at 50% of their maximum light intensity, or at 70%. By activating the light segments with this light intensity, it makes it possible to have a large amplitude of possible light intensities for each light segment, and therefore better management of the light distribution of the second light beam while forming an overall light beam that is regulatory.

Advantageously, the light intensity of the light segments of the second light beam may be modulated such that the overall light beam resulting from the superposition of the first light beam with cutoff and of the second light beam forms a regulatory low beam according to the UNECE R123 regulation in force as of the filing date of the present application.

Advantageously, the light intensity of the light segments of the second light beam may be modulated such that the overall light beam resulting from the superposition of the first light beam with cutoff and of the second light beam forms a dynamic bending light (DBL) beam.

Advantageously, the second light beam has two superposed lines of light segments, the light segments of the lower line being able to illuminate the region located astride the first horizontal axis. The light segments of the upper line may then supplement the light distribution formed by the lower line so as to form another lighting function.

The invention also relates to a method for controlling the lighting device according to the invention.

Advantageously, the light intensity of each of the light segments of the second light beam located astride the first horizontal axis is modulated such that the position of a region of maximum light intensity of the overall light beam formed by the superposition of the first light beam and of the second light beam is shifted when the vehicle turns.

Advantageously, the shifting of the region of maximum light intensity is related to the radius of curvature of the turn. Thus, the smaller the radius of curvature, the greater the shifting of the region of maximum light intensity with respect to the optical axis of the first light beam. This ensures optimal illumination of the turn.

BRIEF DESCRIPTION OF THE DRAWINGS

Other features and advantages of the present invention will become more clearly apparent from the description and the drawings, in which:

FIG. 1 is a side view of the front of a motor vehicle equipped with a device according to the invention;

FIG. 2 shows the projection, on a screen, of a first light beam with cutoff according to a first exemplary embodiment;

FIG. 3 shows the projection, on a screen, of a first light beam with cutoff according to a second exemplary embodiment;

FIG. 4 shows the projection, on a screen, of a second light beam;

FIG. 5 shows the projection, on a screen, of the overall light beam resulting from the superposition of the first light beam with cutoff according to the first exemplary embodiment, the projection of which is shown in [FIG. 2], and of the second light beam, the projection of which is shown in [FIG. 4], when the vehicle is driving in a straight line;

FIG. 6 shows the projection, on a screen, of the overall light beam resulting from the superposition of the first light beam with cutoff according to the first exemplary embodiment, the projection of which is shown in [FIG. 2], and of the second light beam, when the vehicle is turning right;

FIG. 7 shows the projection, on a screen, of the overall light beam resulting from the superposition of the first light beam with cutoff according to the first exemplary embodiment, the projection of which is shown in FIG. 2, and of the second light beam, when the vehicle is turning left.

DETAILED DESCRIPTION

Throughout the remainder of the description, what is meant by longitudinal direction L is the direction in which the vehicle moves, what is meant by transverse direction T is the direction that extends transversely with respect to the vehicle and that is perpendicular to the longitudinal direction, and what is meant by vertical direction V is the direction that extends from the bottom to the top of the vehicle and that is perpendicular to the longitudinal direction and to the transverse direction. These directions are represented by the trihedron L, V, T in FIG. 1.

Hereinafter, the term "intensity" used without further specification will refer to light intensity.

FIG. 1 schematically shows a motor vehicle 1 equipped with a lighting device 5 according to the present invention. The lighting device 5 is fixed with respect to the vehicle 1.

The lighting device 5 comprises a first lighting module 10 comprising means for emitting, along an optical axis 11, a first light beam 12 with cutoff and a second lighting module 20 comprising means for emitting a second light beam 22. The means for emitting the first light beam 12 and the second light beam 22 are shown in [FIG. 1] as being in distinct lighting modules. However, they could be in the same lighting module.

The lighting device 5 is able to project an overall light beam 2 resulting from the superposition of the first light beam 12 with cutoff and of the second light beam 22.

FIGS. 2 to 7 show the projection, on a vertical transverse screen 30 situated 25 m in front of the vehicle 1, of the first light beam 12 with cutoff and/or of the second light beam 22.

FIG. 2 and FIG. 3 show, respectively, the projection, on the screen 30, of a first exemplary embodiment of the first light beam 12 with cutoff and the projection, on the screen 30, of a second exemplary embodiment of the first light beam 12 with cutoff.

In each of these exemplary embodiments, the first light beam 12 with cutoff illuminates a portion that is delimited vertically upward by a cutoff 13. The cutoff 13 features a substantially horizontal line 14 comprising a cutout 16. The projection of the first light beam 12 with cutoff extends in a coordinate system formed by a horizontal reference axis HR parallel to a first horizontal axis H1 passing through the substantially horizontal line 14 and a vertical reference axis VR perpendicular to the horizontal reference axis HR and to the optical axis 11 of the means for emitting the first light beam 12 with cutoff. The optical axis 11 passes through the center O of the coordinate system.

The substantially horizontal line 14 is located at a height of −0.57° and the cutout 16 comprises a proximal longitudinal end 16a located in the coordinate system along the horizontal reference axis HR at 1.25° and a lower vertical end 16c located in the coordinate system along the vertical reference axis VR at a height of −0.75°. The cutout 16 also comprises a distal longitudinal end 16b. The cutout 16 then forms a notch in the first light beam 12.

In one example, not shown, the cutout could comprise only a proximal longitudinal end and a lower vertical end, thus forming a cutout over the entire width of the first light beam from the proximal longitudinal end.

The proximal longitudinal end 16a is formed by an oblique segment, that is to say a segment that has an inclination with respect to the vertical reference axis VR. The position of the proximal longitudinal end 16a in the coordinate system along the horizontal reference axis HR is taken at the level of the substantially horizontal line 14 corresponding to the upper end 18 of the segment forming the proximal longitudinal end 16A of the cutout 16.

The distal longitudinal end 16b is also formed by an oblique segment. The lower vertical end 16c is formed by a segment that is parallel to the horizontal reference axis HR and joins the lower ends of the oblique segments that form the proximal 16a and distal 16b longitudinal ends.

In FIG. 3, the cutoff 13 has a second cutout 15 comprising only a proximal longitudinal end 15a located in the coordinate system along the horizontal reference axis at −3° and a lower vertical end 15c located in the coordinate system along the vertical reference axis at a height of −0.75°, that is to say at the same height as the lower vertical end 16c of the cutout 16. The first light beam 12 is cut out over its entire width from the proximal longitudinal end 15a.

The proximal longitudinal end 15c of the second cutout 15 is formed by a segment parallel to the vertical reference axis VR.

In the case of the vehicle 1 being driven on the left-hand side, the projection of the first light beam with cutoff would be the mirror image of the projection of the first light beam 12 with cutoff shown in FIG. 2 and FIG. 3 with respect to the vertical axis VR. The proximal longitudinal end 16a of the cutout 16 would be located in the coordinate system along the horizontal reference axis HR at −1.25° and, where applicable, the proximal longitudinal end 15a of the second cutout 15 would be located in the coordinate system along the horizontal reference axis HR at 3°.

FIG. 4 shows the projection, on the screen 30, of the second light beam 22. The second light beam 22 is divided horizontally into a plurality of light segments 23a to 23n which are selectively activatable and form a line 25. The second light beam 22 is shown in the same coordinate system as that described with reference to FIGS. 2 and 3. The second light beam 22 is here divided into 14 segments 23a to 23n which each illuminate a corresponding region on the screen 30. The segments 23a to 23n may overlap transversely slightly in order to ensure uniform illumination.

The light segments 23a to 23n have widths, taken along the horizontal reference axis HR, that are different. The width of the light segments 23a to 23n increases stepwise with increasing distance from the vertical reference axis VR. The light segments 22a to 23n are distributed into groups of light segments of the same width.

On the right-hand side of the vertical reference axis VR, a first right-hand group GR1a comprises the light segments 23h to 23k, a second right-hand group GR2a comprises the light segments 23l and 23m and a third right-hand group GR3a comprises the light segment 23n. On the left-hand side of the vertical reference axis VR, a first left-hand group GR1b comprises the light segments 23d to 23g, a second left-hand group GR2b comprises the light segments 23b and 23c and a third left-hand group GR3b comprises the light segment 23a.

The first right-hand group GR1a and the first left-hand group GR1b are the groups closest to the vertical reference axis VR. The second right-hand group GR2a and the second left-hand group GR2b come after the first right-hand group GR1a and the first left-hand group GR1b, respectively, with increasing distance from the vertical reference axis VR. The third right-hand group GR3a and the third left-hand group GR3b come after the second group GR2a and the second group GR2b, respectively, with increasing distance from the vertical reference axis VR.

The width of the light segment 23n of the third right-hand group GR3a is greater than the width of the light segments 23l and 23m of the second right-hand group GR2a which is in turn greater than the width of the light segments 23h to 23k of the first right-hand group GR1a.

Likewise, the width of the light segment 23a of the third left-hand group GR3b is greater than the width of the light segments 23b and 23c of the second left-hand group GR2b which is in turn greater than the width of the light segments 23e to 23g of the first left-hand group GR1b.

The resolution of the second light beam 22 is thus adapted according to the interest presented by the region of the road which is illuminated. The resolution close to the vertical reference axis VR and therefore close to the optical axis 11 of the means for emitting the first light beam 12 is higher than the resolution with increasing distance from the optical axis 11. In this way, the number of light segments is limited while maintaining sufficient resolution close to the optical axis 11.

In one variant, not shown, the second light beam 22 has a second line of light segments which are selectively activated and superposed over the line 25 of light segments 23a, . . . , 23n. These light segments may then supplement the distribution formed by the line 25 so as to form a high beam function.

The light intensity of each light segment 23a to 23n is capable of being individually modulated between an off state and a state of maximum light intensity, the intensity being able to be modulated between these two extremes. Each segment 23a to 23n is, for example, illuminated by an associated light-emitting diode, the intensity of which can be individually controlled.

The light intensity of the segments 23a, . . . , 23n is limited by the light intensity of the overall light beam 32 which must not exceed a predetermined intensity value over the region covered by the second light beam 22 in order to be regulatory. For example, the light intensity of the overall beam should not exceed 44 100 cd in this region.

The light segments 23a to 23n may be activated at 50% of their maximum intensity or at 70% of their maximum intensity without the light intensity of the overall light beam 32 exceeding the predetermined intensity value.

In FIGS. 4 to 7, the light segments that have a higher intensity in comparison with the intensity of the other light segments are hatched. The denser the hatching, the higher the light intensity.

Thus, in FIG. 4, the light segment 23h has the highest light intensity and the region on the screen covered by the light segments 23h to 23k is a region of maximum light intensity 24. Thus, the region of maximum intensity 24 is located in a region close to the optical axis 11. By individually modulating the light intensity of the light segments 23a to 23n, it is possible to move the region of maximum light intensity 24 of the second light beam 22.

The light segments 23a to 23n have a junction with each of their one or more neighboring light segments. A cutoff may thus be formed in the second light beam 22 at each of these junctions.

The neighboring light segments 23g and 23h have a junction 26 superposed over the vertical reference axis VR. The junction between these two neighboring segments 23g, 23h makes it possible to produce a cutoff in the second light beam 22 at the level of the vertical reference axis VR.

FIG. 5 shows the projection, on the screen 30, of an overall light beam 32 resulting from the superposition of the first light beam 12 with cutoff according to the first exemplary embodiment, the projection of which is shown in FIG. 2, and of the second light beam 22, the projection of which is shown in FIG. 4, when the vehicle 1 is driving in a straight line.

It is also possible to superpose the first light beam 12 with cutoff according to the second exemplary embodiment, the projection of which is shown in FIG. 3, and the second light beam 22, the projection of which is shown in FIG. 4.

The light segments 23a to 23n illuminate a region located astride the first horizontal axis H1. Each light segment 23a to 23n comprises a lower vertical end 23a1 to 23n1 and an upper vertical end 23a2 to 23n2. Not all of the references are shown in order to make the figure easier to read. The first horizontal axis H1 is located between the lower vertical end 23a1 to 23n1 and the upper vertical end 23a2 to 23n2 of each of the light segments 23a to 23n.

The lower vertical ends 23a1 to 23n1 of the light segments 23a to 23n of the second light beam 22 are all located at the same height along the vertical reference axis at −0.75°. The height of the lower vertical end 16c of the cutout 16 is substantially the same as the height of the lower vertical end 23a1 to 23n1 of the light segments 23a to 23n. The cutout 16 and the light segments 23a to 23n may overlap slightly in order to allow good uniformity of the overall light beam 32. Thus, the light intensity of the light segments 23i to 23l which completely cover part of the cutout 16 is not limited by the light intensity input of the first light beam 12 with cutoff. It is therefore easier to control the light intensity at the cutout 16, and the light segments 23i to 23l may have a higher intensity, which makes them more visible.

The light intensity of the light segments of the second light beam 22 may be modulated such that the overall light beam 32 forms a low beam according to the UNECE R123 regulation in force as of the filing date of the present application.

The cutoff of the low beam is formed by a junction between two neighboring light segments; in particular, it may be produced by the junction 26 between the light segments 23g and 23h. In this case, the light intensity of the light segments 23a to 23g is zero and the light intensity of the segments 23h to 23n is non-zero, the intensity of these light segments 23h to 23n decreasing from the light segment 23h to the light segment 23n.

The light intensity of the light segments 23a to 23n of the second light beam 22 may also be modulated such that the overall light beam 32 forms a dynamic bending light beam.

By modulating the intensity of the light segments 23a to 23n, the region of maximum light intensity 24 may be moved. The region of maximum intensity of the overall light beam 32 is then also moved. The light intensity of the overall light beam 32 may then be adapted according to the direction of the turns taken by the vehicle 1 and according to the radius of curvature of the turns. Additionally, the cutoff of the second light beam 22 formed by the junction between two neighboring light segments may also be moved.

The second light beam 22 illuminates above the first horizontal axis H1 over the entire width of the first light beam 12 with cutoff. The entire width of the scene illuminated by the first light beam 12 with cutoff may thus be illuminated by the second light beam 22. The dynamic lighting function may then be achieved over the entire width of the first light beam 12 with cutoff.

In FIG. 5, the vehicle 1 is driving in a straight line. The region of maximum intensity 24 is located close to the optical axis 11.

FIG. 6 illustrates the case of the vehicle 1 taking a right turn. The region of maximum intensity 24 is shifted to the right with respect to the region of maximum intensity 24 shown in [FIG. 5]. The region of maximum intensity 24 is here formed by the light segments 23*l*, 23*m* which have the highest light intensity from among all of the light segments 23*a*, . . . , 23*n*. The cutoff of the second light beam 22 is also shifted. It is formed by the junction between the neighboring light segments 23*k* and 23*l*. The light intensity of the light segments 23*a* to 23*k* is zero and the light intensity of the segments 23*l* to 23*n* is non-zero, the intensity of these light segments 23*l* to 23*n* decreasing from the light segment 23*l* to the light segment 23*n*.

FIG. 7 illustrates the case of the vehicle 1 taking a left turn. The region of maximum intensity 24 is shifted to the left with respect to the region of maximum intensity shown in FIG. 5. The region of maximum intensity 24 is here formed by the light segments 23*b*, 23*c* which have the highest light intensity from among all of the light segments 23*a*, . . . , 23*n*. The cutoff of the second light beam 22 is also shifted. It is formed by the junction between the neighboring light segments 23*a* and 23*b*. The light intensity of the light segment 23*a* is zero and the light intensity of the segments 23*b* to 23*n* is non-zero, the intensity of these light segments 23*b* to 23*n* decreasing from the light segment 23*b* to the light segment 23*n*.

The shifting of the region of maximum intensity 24 with respect to the optical axis 11 of the first light beam 12 is related to the radius of curvature of the turn. The smaller the radius of curvature, the greater the shifting of the region of maximum intensity 24 with respect to the optical axis 11. The turn is then optimally illuminated.

What is claimed is:

1. A lighting device for a motor vehicle comprising:
    a means for emitting a first light beam with cutoff along an optical axis, the cutoff having a substantially horizontal line comprising a cutout; the cutout extending in a coordinate system formed by a horizontal reference axis (HR) parallel to a first horizontal axis (H1) passing through said substantially horizontal line and a vertical reference axis (VR) perpendicular to the horizontal reference axis (HR) and to said optical axis, said optical axis passing through the center of the coordinate system;
    a means for emitting a second light beam horizontally divided into a plurality of selectively activated light segments, the light segments segments configured to illuminate a region located astride the first horizontal axis (H1), characterized in that the cutout comprises:
    a proximal longitudinal in the coordinate system along the horizontal reference axis (HR) between 1.25° and 1.5° or between −1.25° and −1.5°; and
    a lower vertical end located in the coordinate system along the vertical reference axis (VR) at a height of −0.75° or below.

2. The lighting device of claim 1, characterized in that it-said lighting device has two neighboring light segments having a junction superposed over the vertical reference axis (VR).

3. The lighting device of claim 1, characterized in that the light segments of the second light beam comprise a lower vertical end and in that the height of the lower vertical end of each of the light segments which are superposed with the cutout is located in the coordinate system along the vertical reference axis (VR) at −0.75° or below and in that the height of the lower vertical end of the cutout is substantially the same as the height of the lower vertical end of the light segment which has the highest lower vertical end from among all of the light segments which are superposed with the cutout.

4. The lighting device of claim 3, characterized in that the lower vertical ends of each light segment of the second light beam are all located at the same height along the vertical reference axis (VR) at −0.75° or below and in that the height of the lower vertical end of the cutout is substantially the same as the height of the lower vertical end of the light segments.

5. The lighting device of claim 1, characterized in that the cutoff of the first light beam has a second cutout having a proximal longitudinal end located in the coordinate system along the horizontal reference axis (HR) at −3° or less, when the proximal longitudinal end of the cutout is located between 1.25° and 1.5°, or at 3° or more, when the proximal longitudinal end of the cutout is located between −1.25° and −1.5°.

6. The lighting device of claim 1, characterized in that all of the light segments of the second light beam have a width that is the same when taken along the horizontal reference axis (HR).

7. The lighting device of claim 1, characterized in that at least two light segments of the second light beam have a width that is different when taken along the horizontal reference axis (HR).

8. The lighting device of claim 1, characterized in that the light segments of the second light beam have a width that gets wider with increasing distance from the vertical reference axis (VR).

9. The lighting device of claim 1, characterized in that a light intensity of each light segment segment is capable of being individually modulated between an off state and a state of maximum light intensity.

10. The lighting device of claim 9, characterized in that the light segments of the second light beam may be activated at 50% of said second light beam's maximum light intensity, or at 70%.

11. The lighting device of claim 9, characterized in that the light intensity of the light segments segments of the second light beam may be modulated such that the overall light beam resulting from the superposition of the first light beam with cutoff and of the second light beam forms a regulatory low beam.

12. The lighting device of claim 9, characterized in that the light intensity of the light segments segments of the second light beam may be modulated such that the overall light beam beam resulting from the superposition of the first light beam with cutoff and of the second light beam forms a dynamic bending light (DBL) beam.

13. The lighting device of claim 1, characterized in that the second light beam has two superposed lines of light segments, the light segments of the lower line being able to illuminate the region located astride the first horizontal axis (H1).

14. A method for controlling the lighting device of claim 9, characterized in that the light intensity of each of the light segments of the second light beam located astride the first horizontal axis (H1) is modulated such that a position of a region of maximum light intensity of the overall light beam that is formed by the superposition of the first light beam and of the second light beam is shifted when the vehicle turns.

15. The method for controlling the lighting device of claim 14, characterized in that a shifting of the region of maximum light intensity is related to a radius of curvature of a turning of the vehicle.

\* \* \* \* \*